(No Model.)
U. D. ALEXANDER.
Dust Pan.
No. 234,644. Patented Nov. 23, 1880.
Fig 1.
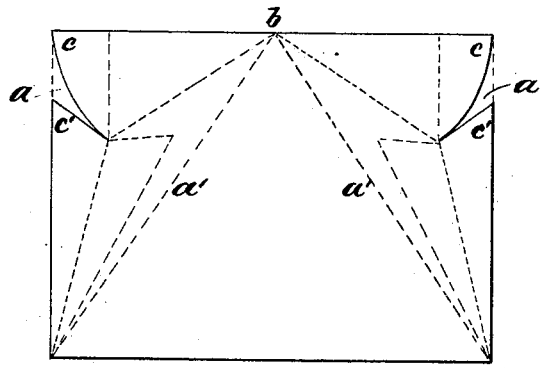
Fig 2.
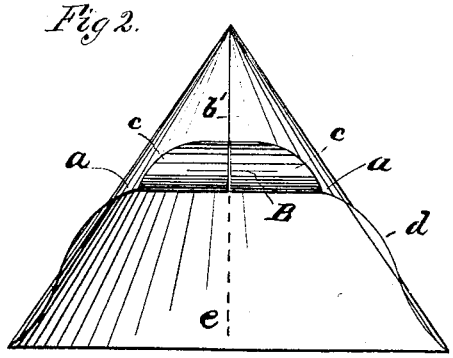
Fig 3. Fig 4.
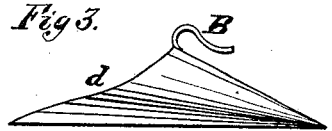 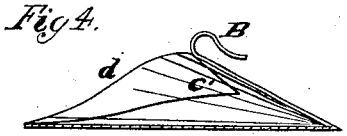
Fig 5.
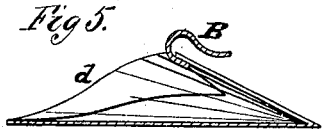
Witnesses
Henry Frankfurts.
B. F. Morse
Inventor.
Urbana D. Alexander
per F. F. Warner, his
Attorney.
N. PETERS, PHOTO-LITHOGRAPHER, WASHINGTON, D. C.

UNITED STATES PATENT OFFICE.

URBANA D. ALEXANDER, OF CHICAGO, ILLINOIS.

DUST-PAN.

SPECIFICATION forming part of Letters Patent No. 234,644, dated November 23, 1880.

Application filed September 10, 1880. (No model.)

*To all whom it may concern:*

Be it known that I, URBANA D. ALEXANDER, of Chicago, in the county of Cook and State of Illinois, have invented certain new and useful Improvements in Dust-Pans, of which the following, in connection with the accompanying drawings, is a specification.

In the drawings, Figure 1 is a plan or face view of a blank from which my pan may be made; Fig. 2, a top or plan view of the finished pan; Fig. 3, a side view of the same; Fig. 4, a vertical central section from front to rear; and Fig. 5, a like representation, showing a modification with respect to the handle.

Like letters of reference indicate like parts.

To make my pan I use a sheet of sheet metal, and if I wish to prevent a raw edge on the sides of the pan I cut the sheet as shown at *a a*. I then fold the sheet over along the lines *a' a'*, turning them toward each other, so that the edge *b* will meet itself along the line *b'*. I then turn back the corners *c c*, as shown, and lay the corners *c' c'* down, as indicated in Figs. 4 and 5.

A covered or hooded dust-pan is thus formed by folding a single sheet upon itself. The pan will also thus be furnished with a handle, B, and the edges *d d* will be smooth.

It is to be understood that the sides or other parts of the pan may be so shaped as to give it a graceful or pleasing appearance.

The handle B is not absolutely essential, and it is also obvious that the handle may be made of a separate piece, as indicated in Fig. 5, and when so made it may be so applied as to hold the meeting edges of the hood together.

When the handle is not made in the same piece with the rest of the pan the cuts *a a* need not be made, unless for the purpose of admitting of the edges of the sides being turned over for the purpose set forth.

It is also obvious that the sheet may be turned over in the opposite direction, or so that the joint will be in the bottom of the pan instead of in the hood—for example, at the line *e*—in which latter case the edges there meeting should be held together in some suitable way.

The length of the sheet compared to its breadth will determine whether the parts turned over will meet in the hood or in the bottom. I call the larger or flat part the "bottom."

I may also use straw-board or like material instead of sheet metal.

Having thus described my invention, what I claim as new, and desire to secure by Letters Patent, is—

A covered or hooded dust-pan made in one piece, folded or bent, substantially as described, to form the bottom, sides, and cover.

URBANA D. ALEXANDER.

Witnesses:
    F. F. WARNER,
    CHAS. H. TALLMADGE.